No. 642,018. Patented Jan. 23, 1900.
E. TERNSTRÖM.
AUTOMATIC MACHINE GUN.
(Application filed July 25, 1898.)
(No Model.) 10 Sheets—Sheet 4.
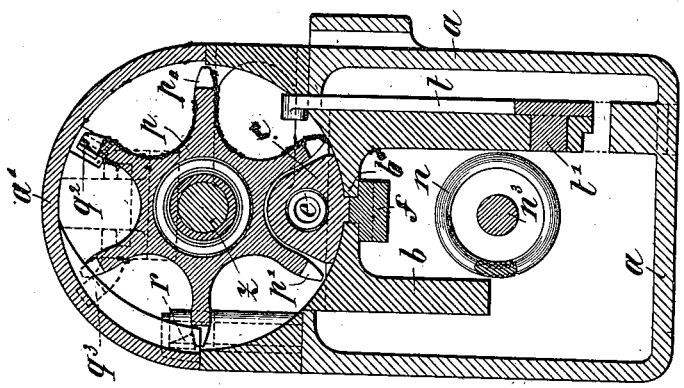
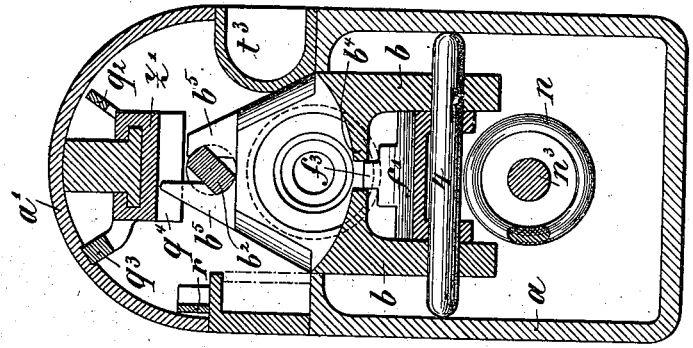
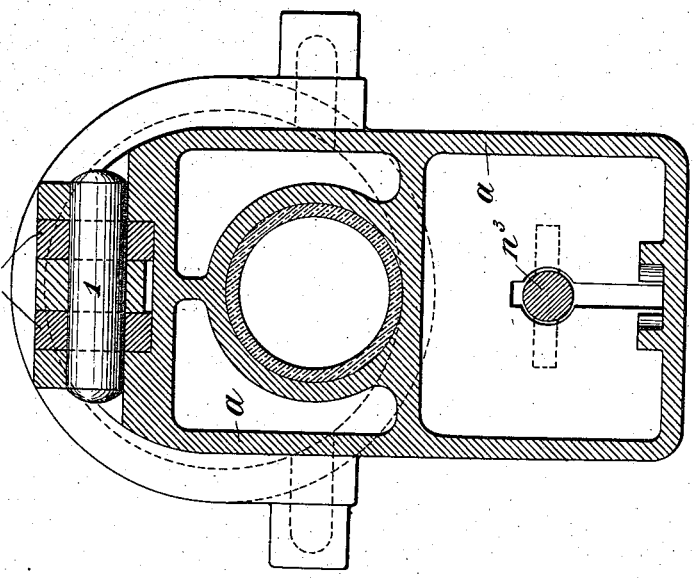
Inventor:
Ernst Ternström
By his Attorneys.
Witnesses.

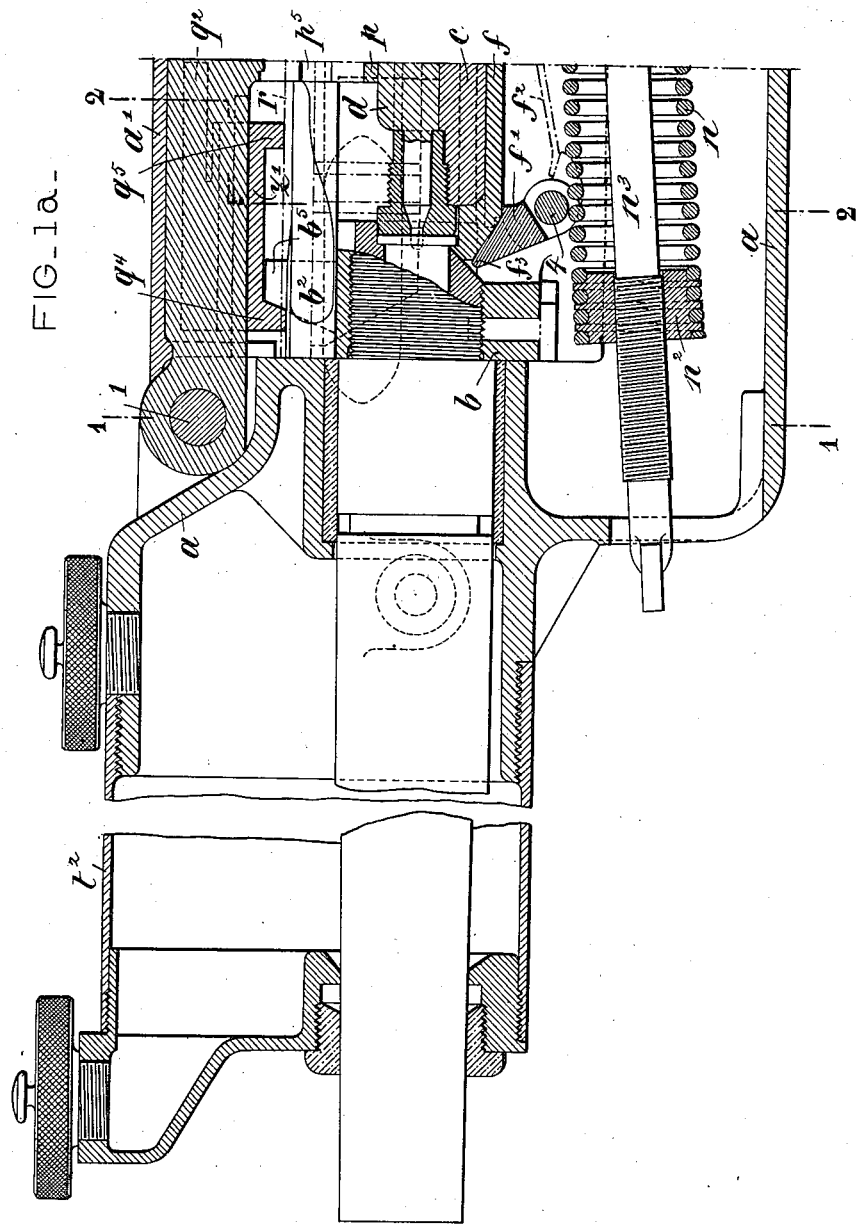

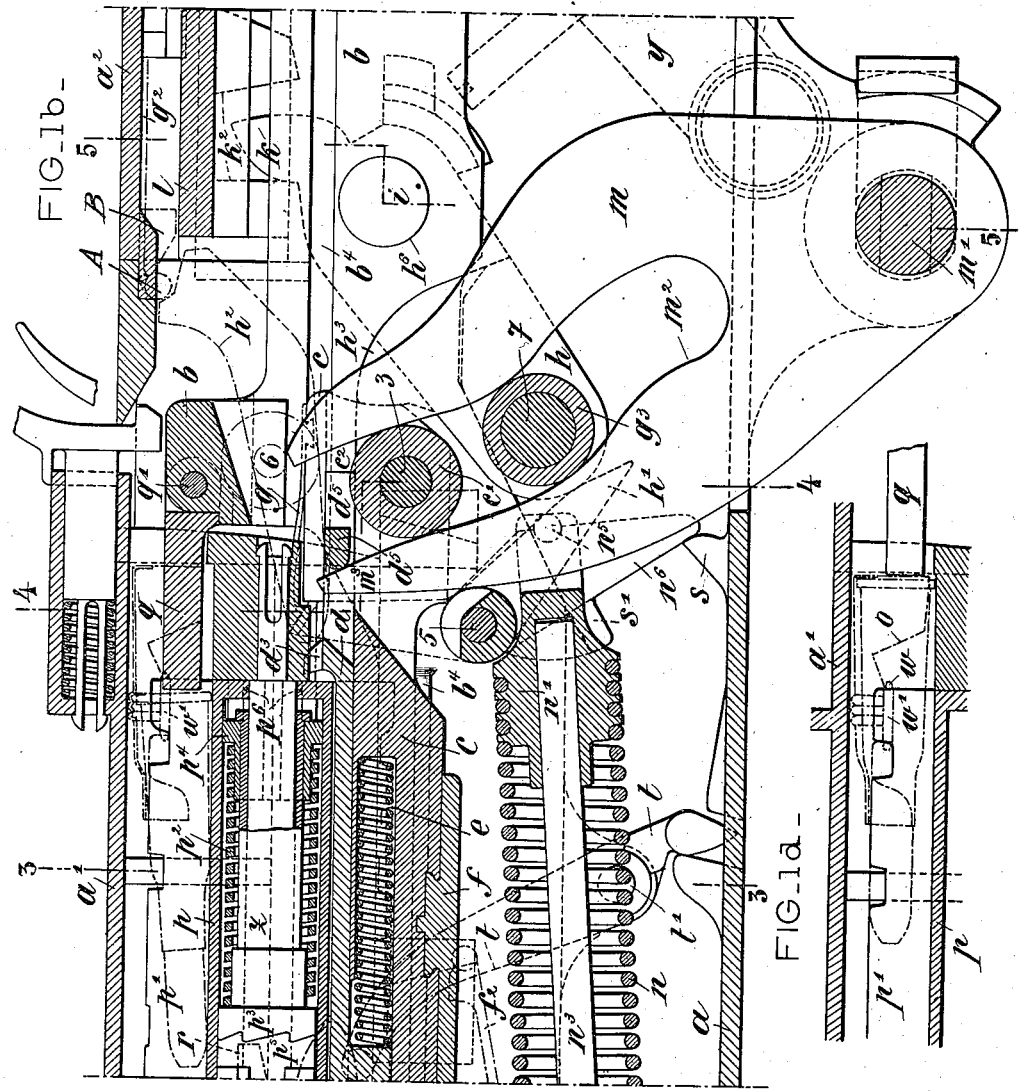

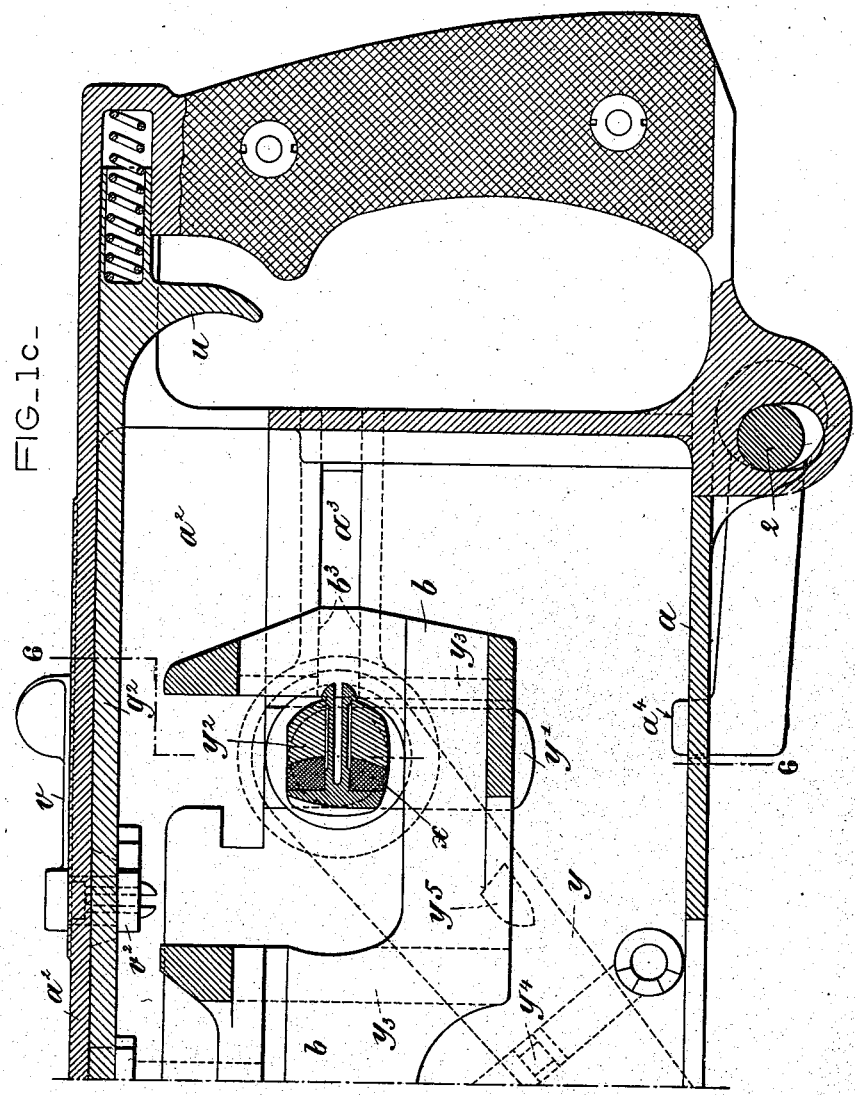

No. 642,018. Patented Jan. 23, 1900.
E. TERNSTRÖM.
AUTOMATIC MACHINE GUN.
(Application filed July 25, 1898.)
(No Model.) 10 Sheets—Sheet 5.
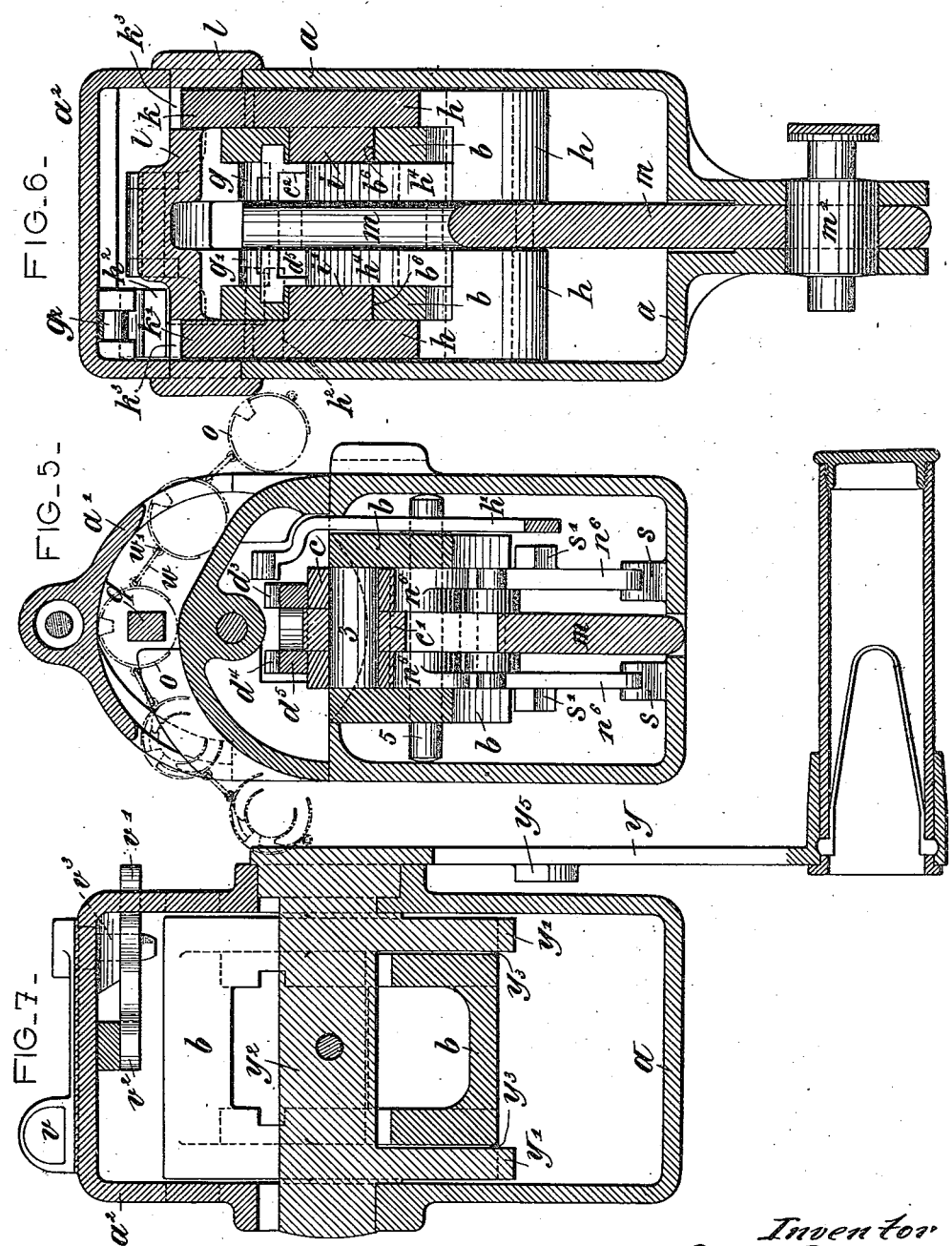

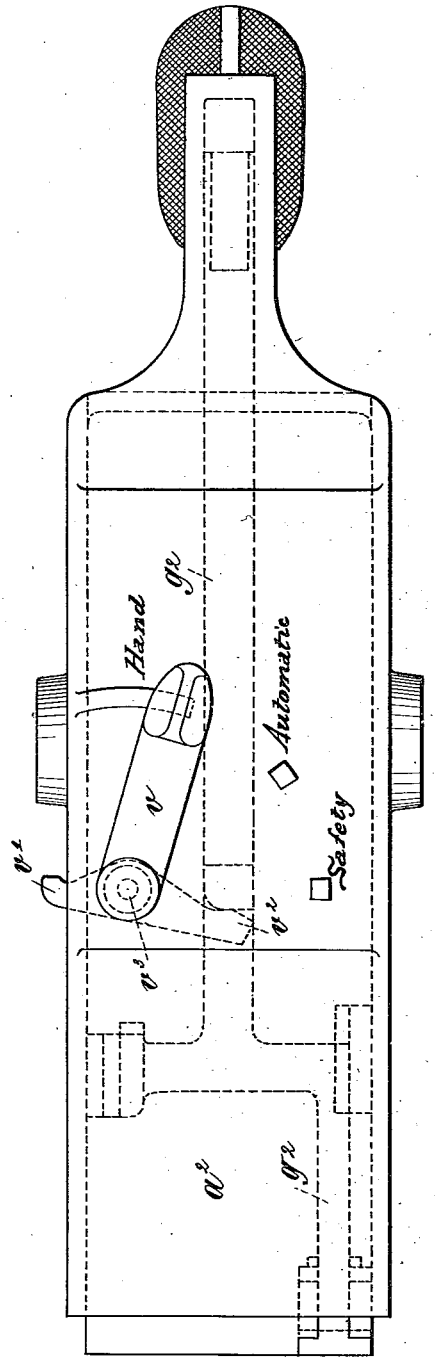

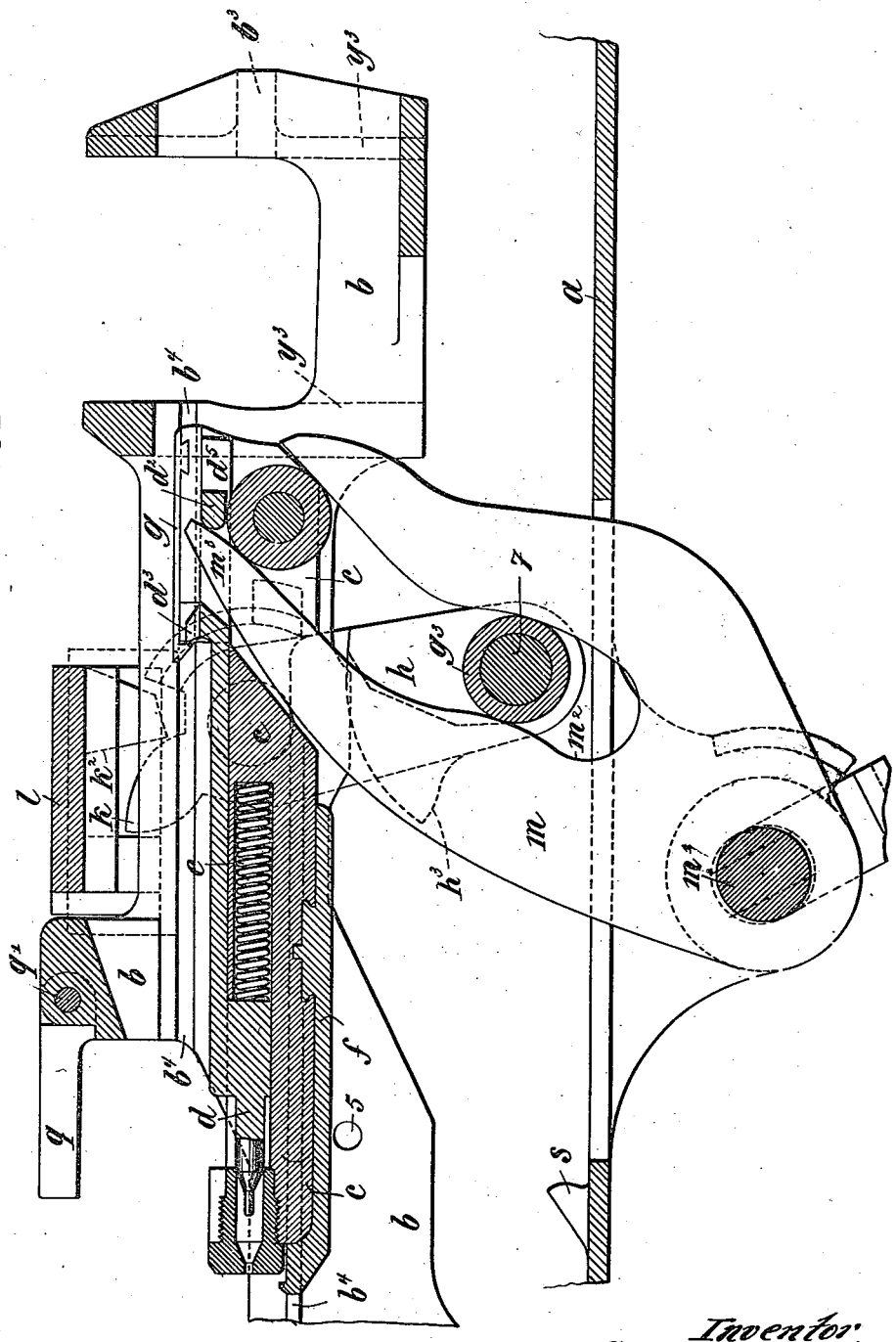

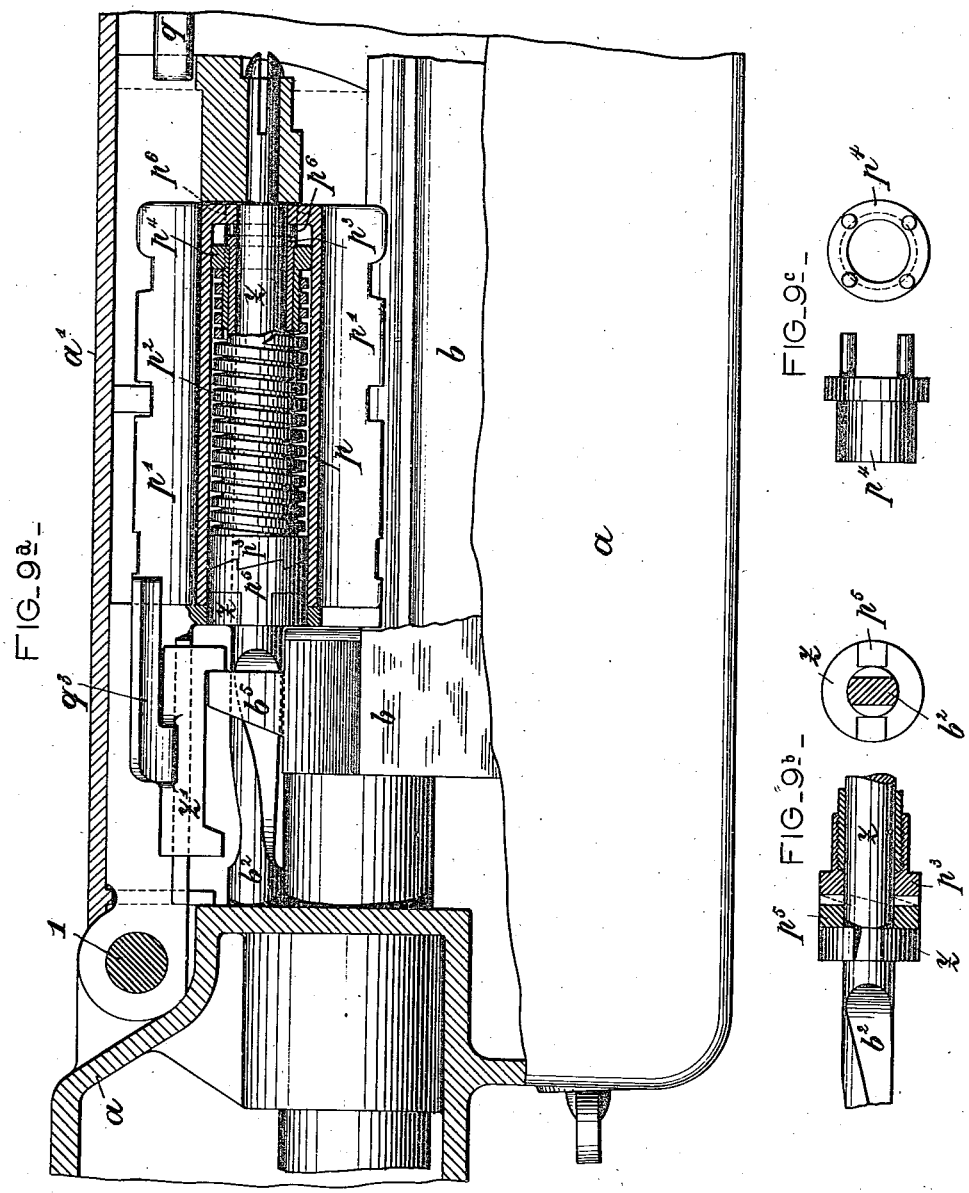

No. 642,018. Patented Jan. 23, 1900.
E. TERNSTRÖM.
AUTOMATIC MACHINE GUN.
(Application filed July 25, 1898.)
(No Model.) 10 Sheets—Sheet 9.
FIG_10_
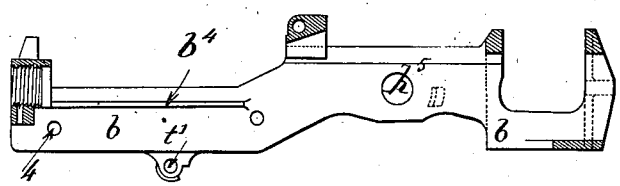
FIG_11_
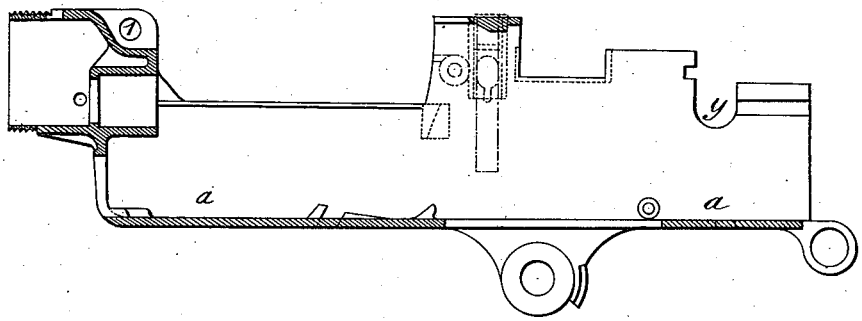
FIG_12_
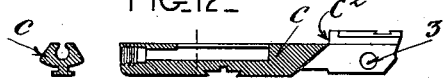
FIG_14_
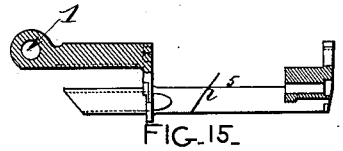
FIG_13_
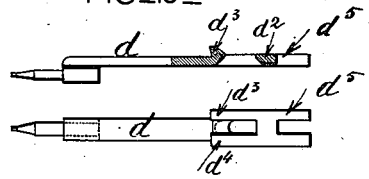
FIG_15_
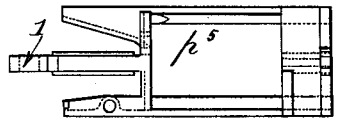

No. 642,018. Patented Jan. 23, 1900.
E. TERNSTRÖM.
AUTOMATIC MACHINE GUN.
(Application filed July 25, 1898.)
(No Model.) 10 Sheets—Sheet 10.
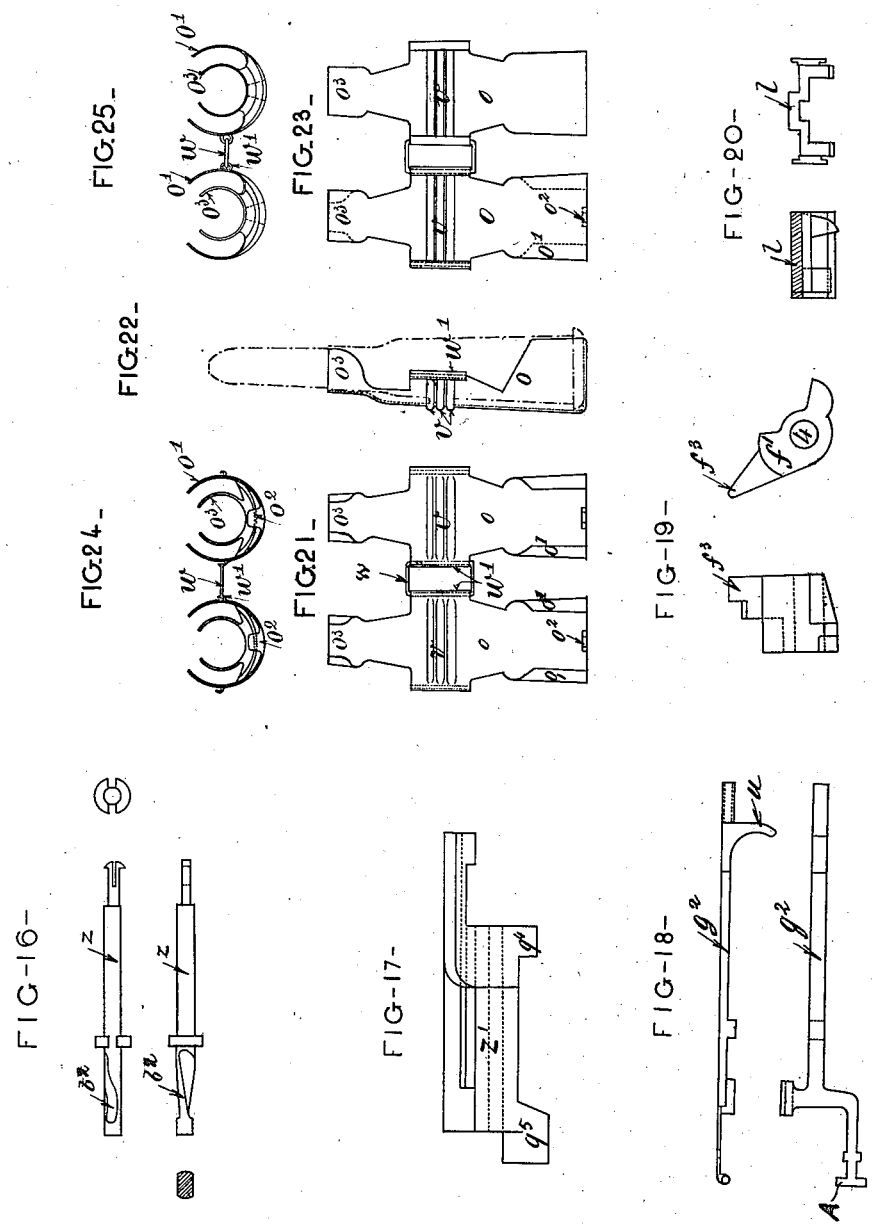

UNITED STATES PATENT OFFICE.

ERNST TERNSTRÖM, OF PARIS, FRANCE.

AUTOMATIC MACHINE-GUN.

SPECIFICATION forming part of Letters Patent No. 642,018, dated January 23, 1900.

Application filed July 25, 1898. Serial No. 686,850. (No model.)

*To all whom it may concern:*

Be it known that I, ERNST TERNSTRÖM, of 8 Rue Auber, Paris, in the Republic of France, have invented certain new and useful Improvements in Automatic Machine-Guns, in which firing can also be effected by hand, of which the following is a specification.

My invention relates to improvements in automatic machine-guns in which firing can be done by hand and in which all the movements of the different parts or pieces are effected by the reciprocation of the system of recoil, such reciprocation being produced either by the explosion of the charge of the cartridge in automatic firing or by the crank-handle when firing by hand.

Not to mention certain structural arrangements which it has in common with some similar well-known automatic weapons my improved machine-gun is mainly characterized by the following innovations: The rocking movement of the locking-levers, which prevent the movable bolt in the breech-piece from moving relatively to the latter in the closed position, is obtained by a resistance-plate acting on projections of the said levers. This arrangement takes the place of the rack actually used. The extractor is combined with a locking-lever, which prevents it from becoming prematurely disengaged from the cartridge and the end of which also serves to raise up the bullet of the cartridge when inserted into the chamber and for the purpose of preventing it from abutting against the edges of the latter. The movement of the drum for feeding the cartridges held by a special belt is controlled by a piece capable of being moved longitudinally and which is combined with a spring-buffer with an escapement-stop and with a stop for the backward movement. Finally these arrangements are completed, on the one hand, by the special combination of an ejector with the movable breech-piece and the fixed case and, on the other hand, by the combination of the recoil-spring with the lever for engaging the same, whereby the degree of resistance of the recoil-spring may be controlled. Besides these novel or improved parts my machine-gun is remarkable as a whole and also on account of its component parts and the operation of the same in relation to each other.

In the accompanying drawings I have shown my improved machine-gun in one of the forms in which it may be made.

Figures $1^a$, $1^b$, and $1^c$ are portions of a longitudinal section on the axial line of the engine, showing the mechanism in the firing position. Fig. $1^d$ is a detail showing a cartridge before its release with the parts engaging it. Figs. 2 to 7 are cross-sections on the lines 1 1, 2 2, 3 3, 4 4, 5 5, and 6 6, respectively, of the longitudinal section shown in Figs. $1^a$, $1^b$, and $1^c$. Fig. 8 is a plan view of the back cover. Fig. 9 is a vertical section showing the mechanism in the recoil position with some parts omitted. Fig. $9^a$ is a side elevation, with parts in section, showing the feed mechanism. Figs. $9^b$ and $9^c$ are detail views, from side and end, of portions of said mechanism. Fig. 10 is a detail view, in longitudinal section, of the movable breech-piece. Fig. 11 is a longitudinal section of the fixed case. Fig. 12 shows in longitudinal section and in cross-section the bolt of the movable case. Fig. 13 represents the firing-pin in elevation and also in plan. Figs. 14 and 15 are respectively an elevation and a plan of the support for the cartridge-drum. Figs. 16 and 17 show, respectively, the spindle of the drum and the escapement of the same. Fig. 18 represents the trigger both in elevation and in plan. Fig. 19 shows views of the extractor-locking lever. Fig. 20 represents both in section and in elevation the resistance-plate whereby oscillation of the locking-levers of the movable breech-bolt is obtained. Figs. 21 to 25 are views showing two elements of the metallic cartridge-belt in bottom plan view, in side view, and in end view, respectively.

The improved machine-gun is composed of two main parts, which are the case, which remains stationary during the firing, and the recoil system, which contains the barrel and the closing and firing mechanism. All the movements of the different pieces are effected by the reciprocation of the recoil system, which is produced either by the explosion of the charge in automatic firing or by the handle when firing by hand.

*The stationary case.*—The whole of the mechanism is inclosed in the stationary case $a$, Figs. $1^a$ to 7 and Fig. 11, which is provided with guideways for the different pieces and with housings for the spindles on which they rotate. The said case is closed by two covers $a'$ and $a^2$. The cover $a'$ covers the feed device pivoted, like the cover itself, to the spindle 1. The cover $a^2$, Figs. $1^a$, $1^b$, $1^c$, and 8, covers the back part of the firing device. It is provided at the back with a stock, and it carries the finger and rod of the trigger, the indicator, and the indicator-lever. The cover $a^2$ is pivoted to the case by an eccentric spindle 2, provided with a spring-handle, the hooked end of which engages in a mortise in the case, thus insuring the closing position of the eccentric spindle 2. To open the cover $a^2$, one has only to turn half around the spring-handle of the said spindle 2. This operation causes the cover $a^2$ to recede backward and to disengage its pins $a^4$ from apertures in the case $a$, Fig. $1^c$. It may then be rocked on its spindle 2.

*Breech-piece.*—The breech-piece $b$ is screwed to the end of the barrel. It contains all the closing, firing, and extracting devices. It is composed of two sides connected together in front to be screwed onto the barrel and held together at the center and at the back by cross-pieces. The breech-piece $b$ is guided in its movement by pins $b^3$, Figs. $1^c$ and 9, which engage in grooves $a^3$, provided in the case $a$, while inward of the sides are guideways $b^4$ for the bolt $c$, Figs. 10 and 12. Toward the back end of the sides are holes $h^5$ for the trunnions of the locking-levers $h$. The head of the breech-piece carries two projections $b^5$, between which is located a twisted rod $b^2$, Figs. $1^a$ and 3, intended to actuate a part of the feed device. The bolt $c$, having a forward and a backward movement in the guideways $b^4$ of the breech-piece $b$, is provided at its back part with an opening, in which is a roller $c'$, mounted on a spindle 3. When the roller is actuated by the directing-cam $m$, it gives to the bolt an additional movement relatively to the movement of the breech-piece $b$.

The firing mechanism, the extractor, and the sear are contained in the bolt $c$. The firing mechanism comprises a firing-pin $d$ and a percussion-spring $e$. The shank $d^5$ of the firing-pin $d$, Fig. 13, slides in grooves $c^2$ provided for it in the bolt. It is provided with a pin $d^2$, which is carried back by the directing-cam $m$. The firing-pin thus obtains a relative movement with respect to the bolt, whereby the percussion-spring $e$ may be compressed. The firing-pin carries also in front of the pin $d^2$ two hooks $d^3$ and $d^4$, in which engage the sears $g$ and $g'$, Figs. $1^b$, 6, and 9.

*The extractor.*—The extractor $f$ is fixed underneath the bolt $c$ by a dovetailed projection, Fig. $1^b$. It is combined with a locking-lever operating as follows: The extractor-locking lever $f'$, Figs. $1^a$, 9, and 19, is fixed between the sides of the breech-piece $b$ by means of a spindle 4, on which it can oscillate. When the bolt $c$ is in its closed position, the lever $f'$, which is first carried forward by the extractor, is then brought underneath by the spring $f^2$. The extractor is then locked by the said lever in such a manner that it is impossible for it to escape from the rounded edge of the empty cartridge during the first part of the extracting movement—that is to say, until the moment when the bolt begins to be moved relatively to the breech under the action of the operating-cam $m$, which is pushed by the locking-lever $h$ only when the latter is disengaged from the bolt. At this moment when the pressure created by the explosion has already decreased the extractor ceases to be supported by the lever $f'$. The lever carries also at one side a projection $f^3$, which is for the purpose of raising a little the bullet of the cartridge to be inserted in order to prevent its abutting against the edge of the chamber or in the groove provided in the barrel for the hook of the extractor.

The spring-sear $g$, arranged on the bolt, engages the notch $d^3$ of the firing-pin $d$. It thus prevents any displacement of the latter relatively to the bolt until the latter has completely closed the breech. The sear $g$ is disengaged from the firing-pin $d$ when the locking-lever has finished its movement in returning to its closed position. A bell-crank lever $h'$ is placed at the side of the breech-piece, and when operated by the lever $h$ (which it engages) the bell-crank will revolve on a spindle 5, which passes through the sides of the case $a$. The bell-crank lever $h'$ serves as an intermediate piece for releasing the sear $g$ by taking under it, Figs. $1^b$ and 5. The other sear $g'$ is released by means of the trigger-rod $g^2$, which is operated by the finger drawing it back at $u$ when firing automatically or by the handle when firing by hand. The trigger-rod $g^2$ acts on the lever $h^2$, fixed in the case by its spindle 6, by means of a pin A, secured to the rod $g^2$ and engaging an inclined projection B on the cover $a^2$, and the other end of the said lever raises the sear $g'$, Fig. 6.

The locking-levers $h$, arranged behind the bolt $c$, serve when the breech is closed to insure the closing of the same when the charge explodes. Their trunnions $i$ and $i'$, Figs. $1^b$ and 6, engage in holes $h^5$ provided for that purpose in the breech-piece $b$. The two locking-levers are united by a cylindrical spindle 7, carrying at its middle a roller $g^3$. Each of the levers carries a locking projection $h^3$ or $h^4$, which come within the sides and place themselves behind the bolt when the cylindrical spindle rises on account of the rocking movement of the lever when the barrel goes home. When the bolt $c$ is in its closed position, the projections $h^3$ and $h^4$ press against its back end and prevent it from receding relatively to the breech-piece. The breech $b$ is thus securely closed, and the pressure of the discharge is exercised in a line with the axis of the barrel. During the recoil the rocking movement of the locking-levers $h$ takes place in the opposite direction and the locking projections escape from behind the bolt and no longer prevent its relative movement with respect to the breech. The locking-levers through the cylindrical spindle 7, which joins them together, and through the roller $g^3$, mounted on the said spindle, actuate also the directing-cam $m$.

The rocking movement of the locking-levers is obtained by the suitably-shaped projections $k$ and $k'$, with which they are provided at their upper part. The said projections engage in openings $k^2$ and $k^3$, provided in a resistance-plate $l$, fixed and mounted on the case $a$. The form of the front and back walls of the said openings $k^2$ and $k^3$ is so combined with the form of the corresponding faces of the projections $k$ and $k'$ as to obtain a suitable movement for the rocking levers. As the projections $k$ and $k'$ are situated above the trunnions $i$ and $i'$, the rectilinear movement of the breech-piece $b$ determines the rocking movement of the levers $h$. During the recoil the projections $k$ and $k'$ only abut against the back walls of the openings $k^2$ and $k^3$, and after a certain time. Therefore the unlocking of the bolt $c$ only begins after the pressure determined by the explosion has completely subsided.

*The directing-cam.*—The directing-cam $m$, actuated by the rocking levers and pivoted to a fixed spindle $m'$, gives an additional movement to the bolt $c$. It is formed of two branches arranged in a vertical plane at the center of the case $a$ and which move in the opening of the bolt $c$ between the two locking projections $h$ and $h'$. The roller $c'$ of the bolt $c$ and the cylindrical spindle 7, with the roller $g^3$ of the locking-levers, pass through the groove $m^2$ of the directing-cam $m$, so that when the locking-levers oscillate the directing-cam swings and gives to the bolt $c$ an additional movement. The forward end $m^3$ of the directing-cam $m$ compresses during the recoil the firing-pin spring by engaging the pin $d^2$ of the firing-pin $d$ by reason of the different positions which the directing-cam $m$ takes relatively to the bolt $c$.

*The recoil-spring.*—The recoil-spring $n$, placed in the case under the breech-piece, brings forward at each operation the whole of the recoil system. It is mounted at its forward end on a nut $n^2$ and at its rear end on a trunnion-head $n'$, while a screw-threaded rod $n^3$, screwed in the nut $n^2$, serves to regulate the tension of the spring, and at the same time rests on the case at its front end, on which is a handle. The trunnion-head $n'$ is pivoted by means of its trunnions $n^5$ to the piece $n^6$, which connects the spring to the breech-piece $b$. The said piece $n^6$ is pivoted to the breech-piece by means of the spindle 5, the other end of the piece $n^6$ pressing on the case $a$ and on the projections $s$. The piece $n^6$ carries at each side bosses $s'$, which after a certain amount of recoil abut under the sides of the breech-piece $b$, thus connecting the piece $n^6$ with the breech-piece and allowing the spring to act directly on the said breech-piece, Figs. 1$^b$ and 5. This arrangement has been adopted in order to adjust the resistance of the recoil-spring according to the work to be done at the end of the recoil, the bolt striking on a rubber abutment-piece $x$, which serves to store the live force remaining in the pieces in motion and to help the barrel going home again.

*Feed of the cartridges.*—The cartridges are fed, the extraction of the exploded cartridges, and the expulsion of the latter are effected in six operations, as follows: first, feeding of the belt to the extent of the distance comprised between the centers of the two cartridges; second, disengagement of a cartridge from the belt; third, removal of the cartridges to the rear of the chamber of the barrel; fourth, insertion of the cartridges in the said chamber; fifth, extraction from the firing-chamber of each of the empty cartridges; sixth, expulsion from the feed-drum of each of the empty cartridges.

The feed device acts simultaneously on several cartridges, the said cartridges being held in a metal band by yielding cartridge-carriers, which embrace the bodies of the same.

*The metal band.*—The metal feed-band for the ammunition is made up by a series of yielding cartridge-carriers $o$, Figs. 21 to 25, the rear end $o'$ of each of which encircles the cartridge to the extent of about three-fourths of its circumference at the part near the base, while a heel $o^2$ prevents the cartridge from moving rearward. The front end $o^3$ encircles the cylindrical part in front of the neck of the cartridge. It is yielding at the side to the shoulder of the cartridge, and its clips at that part are so rounded that when the cartridge is pushed forward the shoulder of the same will tend to climb the rounded part and open the clip $o^3$, the cartridge then disengaging itself from the carrier.

The middle part of the piece $o$ is so constructed as to take the form of the cartridge, and to make it rigid three small spun ribs $v$ are given it. The cartridge-carriers are joined together by links $w$, engaged in the fasteners $w'$ of the cartridge-carriers. The metal band thus forms a chain the links of which are spaced equally apart. The said links engage the wings of the feed-drum $p$, which thus carries the band forward. I will mention that in order to render the band flexible the links must be fixed substantially in line with the centers of the cartridge-carriers.

*The feed-drum.*—The feed-drum $p$ of the feed device is placed above the forward part of the breech-piece $b$. It is free to revolve on the spindle $z$ parallel to the axial line of the barrel. It is provided with wings $p'$, which engage between the cartridges when the latter are in the band.

After each shot one of the intervals provided between the wings $p'$ is situated in line with the chamber of the barrel and allows the passage of the bolt $c$ to insert a cartridge and extract the empty one, the operations Nos. 4 and 5, mentioned above, being thus effected. At the same time that the bolt $c$ inserts a cartridge in the chamber between the two lower wings of the drum a cartridge which is between the two upper wings of the same is disengaged from the carrier by the pusher $q$, pivoted to the breech-piece $b$ by the spindle $q'$; but as the amplitude of the movement of the piece $b$ is less than that of the bolt $c$ the pusher $q$ only pushes the said cartridge the distance necessary to disengage it from the metal band and leaves it free between the two wings, thus effecting the operation No. 1. The spindle $z$, on which the drum revolves, is put in motion by the fork $b^5$, Fig. 3, arranged at the upper part of the breech-piece $b$, Figs. 1ª and 3. The said fork actuates the helical parts $b^2$ of the spindle $z$, which therefore revolves in one direction during the recoil and in the other direction when the barrel returns home. A spring $p^2$ is placed within the drum and around the spindle $z$. The said spring is fixed at one end in a ratchet-tube $p^3$ and at the other end onto an abutment $p^4$, which has pins engaging holes $p^6$ in the drum $p$ and which serve to carry the latter forward. Another ratchet $p^5$ is fixed on the spindle $b^2$, with which it turns, and thus carries forward the ratchet $p^3$, which compresses the spring $p^2$. The said spring acts, by twisting, to carry forward the drum $p$ and by compression to hold the ratchets fixed in the pawls. The movement of the drum is regulated and limited by the piece $z'$, which is operated forward and backward by the fork $b^3$ acting on butters $q^4$ and $q^5$. It slides on the pivot-rod of the magazine-support. At its upper part the piece $z'$ carries a spring-butter $q^2$ and a stop $q^3$. During the recoil the spring $p^2$ is compressed; but the stop $q^3$ catches behind the wing of the drum and prevents it from moving. Toward the end of the recoil the fork $b^3$ touches the butter $q^4$ and pushes the piece $z'$ forward, whereby the stop $q^3$ is caused to escape from the wing $p'$, which it was maintaining, and the spring $q^2$ to catch behind the following wing. The drum $p$ then revolves to the extent of one-sixth of a revolution. On the barrel returning home, the fork $b^3$ brings the piece $z'$ back into its first position. The backward movement is prevented by the spring-stop, under which the wing houses itself after having turned one-sixth of a revolution. After each recoil a fresh cartridge is thus brought in line with the barrel in front of the bolt $c$.

*The expulsion of the empty cartridge.*—The expulsion of the empty cartridge is effected by the ejector $t$, which is fixed to the side of the breech-piece by means of its spindle $t'$, on which it can oscillate. Its lower end enters an opening provided for that purpose in the case, so that the reciprocation of the breech-piece gives to the ejector $t$ an oscillating movement, which is greater at its upper end. When the bolt $c$ moves back, the extractor carries forward the empty cartridge as far as between the wings $p'$ of the drum $p$. The drum in revolving carries forward the said cartridge, which is thus carried opposite the ejection-opening. The ejector $t$ is at that moment in its extreme rearward position, Fig. 9. During the return of the barrel the lever $t$ moves quickly forward, meets the empty cartridge, and ejects it through the ejection-opening $t^8$, Fig. 3.

The cooling of the barrel is effected by means of a certain quantity of water contained in a tube $t^2$, fixed at the head of the case and through which the barrel passes. A stuffing-box in front and in the rear on the barrel prevents the water from running off, while two valves fixed to the upper part of the tube—the one in front and the other in the rear—allow the steam to escape.

The handle $y$, placed at the outside of the case $a$, serves to give by hand to the mechanism the same movements as are given it by automatic firing. It is used in loading the drum $p$ and to bring the first cartridge into the barrel, so as to be able to begin automatic firing. The handle $y$ is mounted on a shaft $y^2$, Fig. 7, which passes through the two sides of the case $a$. The said shaft carries within the said casing two projections $y'$, Fig. 7, which act on corresponding bosses $y^3$ of the breech-piece $b$, Figs. 1ᶜ and 9, and push the latter once forward and once backward for each complete revolution. When firing by hand, the shot is fired when the projections $y'$ abut against the breech-piece and are in axial line with the barrel.

During automatic firing the handle $y$ is fixed by the stop $y^4$ in such a position that the projection $y'$ cannot interfere with the reciprocating movement of the breech-piece. Therefore the handle remains stationary during all the time automatic firing is continued, and its spindle, which carries the buffer $x$ of the bolt, serves as a point of support for the said buffer.

The exploding device and safety device are as follows: The firing-pin $d$ is held in its cocked position by the sears $g$ and $g'$. The sear $g$ is automatically raised each time the locking-lever is in its closed position. The sear $g'$ is only raised at the time when it is desired to begin firing, as hereinbefore mentioned, by the trigger-rod $g^2$, which acts on the lever $h^2$. For automatic firing the gunner presses his finger on the nose $u$ of the trigger-rod and draws the latter backward. This movement causes the lever $h^2$ to rock and the sear $g'$ to be raised. So long as the trigger-rod is held to the rearward the lever $h^2$ remains in the same position, and the sear $g'$ becomes disengaged each time the barrel is moved home.

For firing by hand the trigger-rod $g^2$ is at each shot and at the proper time drawn rearward by the handle $y$. For that purpose the handle carries a projection $y^5$, which at each revolution comes in contact with the end $v'$, Fig. 8, of the indicating-lever V. The said lever rocks on the spindle $v^3$ and acts through its other end $v^2$ on a projection of the trigger-rod. On the spindle $v^3$, at the outside, is fixed a handle, by means of which the piece $v$ may be turned to put it into the positions of automatic firing, of firing by hand, or of safety. In the latter position the end $v^2$ of the lever V houses itself behind a projection of the trigger-rod $g^2$ and prevents any rearward movement of the latter, whereby the sear $g'$ is locked.

I claim—

1. An improved automatic machine-gun in which firing by hand can be effected by continuously turning a crank, comprising in combination, a stationary frame having an abutment-plate, a breech-piece sliding in the said frame, a bolt sliding in the said breech-piece, an oscillating locking-lever pivoted to the breech-piece and adapted to release the bolt after a partial backward movement of the breech-piece and when one end of the said locking-lever comes in contact with the said abutment-plate, and an operating-cam pivoted to the stationary frame, governed by the other end of the locking-lever, and giving the said bolt an additional backward movement relatively to the said breech-piece.

2. An improved automatic machine-gun in which firing by hand can be effected by continuously turning a crank, comprising in combination, a stationary frame having an abutment-plate, a breech-piece sliding in the said frame, a bolt sliding in the said breech-piece, an oscillating locking-lever pivoted to the breech-piece and adapted to release the bolt after a partial backward movement of the breech-piece and when one end of the said locking-lever comes in contact with the said abutment-plate, and an operating-cam pivoted to the stationary frame, governed by the other end of the locking-lever, and giving the said bolt an additional backward movement relatively to the said breech-piece, and the firing-pin sliding in the said bolt and adapted for operation by the directing-cam, in such a manner as to give the said firing-pin an additional backward movement relative to the bolt during the backward movement of the breech-piece.

3. In an automatic machine-gun, the combination of a cartridge-extractor mounted on the bolt, and of a spring-controlled locking-lever for the said extractor, pivoted to the breech-piece and having a locking part which, under the action of the spring, takes under the lip or rim of the extractor when the latter is pushed forward, in order to prevent the extractor from being prematurely separated from the cartridge said locking-lever also having an inclined plane which serves to raise the bullet of the cartridge when being inserted in the chamber of the barrel.

4. In an automatic machine-gun, the combination of the stationary frame, a winged spring-barrel for feeding the cartridges, the sliding breech-piece having a projection and carrying a fork, a rod having helical faces and adapted to be rotated by the said fork, a clutch or ratchet connection which serves to join together the spring-barrel and the said rotating rod during the recoil, a slide mounted on the stationary frame and having two abutment-heels, carried forward by the projection on the breech-piece at the end of each stroke of the latter, and carrying a spring-abutment and an escapement-stop to limit the rotation of the spring-barrel during the recoil, and a stop on the stationary frame for arresting the backward movement of the spring-barrel.

5. In an automatic machine-gun, a stationary frame having a projection, a sliding breech-piece, a lever pivoted to said breech-piece, a spiral spring attached on the one hand to the stationary frame and on the other hand to said lever, the latter engaging at its free end the projection of the stationary frame during the first part of the recoil, and being provided with a projection which couples it with the breech-piece during the latter part of the recoil in such a manner as to suitably control the resistance of the spring.

6. In an automatic machine-gun, a stationary frame, a reciprocating breech-piece, and an ejector fixed to the side of the breech-piece by means of a stud about which it can oscillate, its lower end being engaged in an opening in the fixed frame in such a manner that the reciprocation of the breech-piece causes the ejector to oscillate.

7. In an automatic machine-gun, an ejector fixed on the side of the breech-piece by means of a spindle on which it can oscillate, its lower end fitting into an opening of the fixed case, so that the reciprocating movement of the breech-piece shall impart to the ejector an oscillating movement amplified at its upper end.

8. In a recoil-operated machine-gun, the combination with the cartridge-drum, and the sliding breech-piece, of an extractor, a locking-lever for preventing a premature separation of the extractor from the cartridge, and means for operating the said lever by the movement of the breech-piece.

9. In a recoil-operated machine-gun, the combination with the cartridge-drum and the sliding breech-piece, of an extractor, a locking-lever for preventing a premature separation of the extractor from the cartridge, said locking-lever extending adjacent to the cartridge in the firing-chamber to guide and center the cartridge during its insertion, and means for operating said lever by the movement of the breech-piece.

Signed at Paris, in the Republic of France, this 6th day of July, 1898.

ERNST TERNSTRÖM.

Witnesses:
GEORGE LAURENT,
EUGÈNE WATTIER.